US012783672B2

(12) United States Patent
Inoue

(10) Patent No.: US 12,783,672 B2
(45) Date of Patent: Nov. 3, 2026

(54) STORAGE DEVICE INCLUDING UPDATE RESTRICTION AREA, REPLACEABLE UNIT INCLUDING STORAGE DEVICE, AND PROCESSING APPARATUS FOR UPDATING DATA STORED IN STORAGE DEVICE

(71) Applicant: Canon Kabushiki Kaisha, Tokyo (JP)

(72) Inventor: Naoki Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 18/509,401

(22) Filed: Nov. 15, 2023

(65) Prior Publication Data

US 2024/0169064 A1 May 23, 2024

(30) Foreign Application Priority Data

Nov. 21, 2022 (JP) ................................ 2022-185747

(51) Int. Cl.
*G06F 21/57* (2013.01)
*G06F 21/64* (2013.01)

(52) U.S. Cl.
CPC .............. *G06F 21/57* (2013.01); *G06F 21/64* (2013.01)

(58) Field of Classification Search
CPC ................................. G06F 21/57; G06F 21/64
USPC ............................................................ 726/22
See application file for complete search history.

(56) References Cited

U.S. PATENT DOCUMENTS 7,333,738 B2 2/2008 Nasu
10,474,097 B2 * 11/2019 Namiki .............. G03G 21/1882
2019/0092053 A1 * 3/2019 Tanaka .................. B41J 15/044

FOREIGN PATENT DOCUMENTS

EP 1237725 B1 9/2004
EP 3513976 B1 8/2021
JP 2004098564 A 4/2004
JP 2005140800 A 6/2005
JP 2005331539 A 12/2005

(Continued)

OTHER PUBLICATIONS

Yong Zhao, "Secure Tamper Resistant Authentication for Anti-Counterfeit Applications," Sep. 2018, AMF-TRD-T3152, pp. 1-48, XP093146290, Retrieved from the Internet on Mar. 27, 2024 at URL:https://community. nxp.com/pwmxy87654/attachments/pwmxy87654/ connects/132/1/APF-TRD-T3152_China.pdf.

(Continued)

*Primary Examiner* — Linglan Edwards
*Assistant Examiner* — Phuc Pham
(74) *Attorney, Agent, or Firm* — Venable LLP

(57) ABSTRACT

A storage device includes: a control unit configured to determine, when a first command to update first data stored at a first address in a first area of a storage unit to second data is received from an external apparatus, whether or not an update from the first data to the second data is within an update restricted range. In a case where the update to the second data is not within the update restricted range, the control unit is configured to verify a signature received from the external apparatus together with the first command. In a case where a verification is success, the control unit is configured to store the second data at the first address. In a case where a verification is failure, the control unit is configured not to store the second data at the first address.

20 Claims, 11 Drawing Sheets

(56) References Cited

FOREIGN PATENT DOCUMENTS

| | | | | | |
|---|---|---|---|---|---|
| JP | 2006047579 | A | | 2/2006 | |
| WO | WO-2014141139 | A1 | * | 9/2014 | ............ B41J 21/175 |

OTHER PUBLICATIONS

Extended European Search Report dated Apr. 10, 2024 in counterpart European Patent Appln. No. EP 23207374.2.

* cited by examiner

FIG. 4

| ADDRESS | INFORMATION CONTENT | INITIAL VALUE | AREA | DESCRIPTION OF AREA |
|---|---|---|---|---|
| 01h | MANUFACTURE DATE | MANUFACTURE DATE | RO | UPDATE PROHIBITION |
| 02h | SERIAL NUMBER | VALUE OF FOR EACH INDIVIDUAL | | |
| 03h | TONER REMAINING AMOUNT T | 100% | OW | ONLY VALUE INCREASE OR VALUE DECREASE AVAILABLE |
| ... | ... | ... | | |
| 14h | ... | ... | RW | POSSIBLE TO UPDATE TO ANY VALUE |
| ... | ... | ... | | |
| 24h | NEW PRODUCT | 0 | WO | POSSIBLE TO UPDATE TO VALUE OTHER INITIAL VALUE ONLY ONCE |
| ... | ... | ... | | |

FIG. 8

| ADDRESS | INFORMATION CONTENT | INITIAL VALUE | AREA | DESCRIPTION OF AREA |
|---|---|---|---|---|
| 01h | MANUFACTURE DATE | MANUFACTURE DATE | RO | UPDATE PROHIBITION |
| 02h | SERIAL NUMBER | VALUE OF FOR EACH INDIVIDUAL | | |
| 03h | TONER REMAINING AMOUNT T | 100% | OW | ONLY VALUE INCREASE OR VALUE DECREASE AVAILABLE |
| ... | ... | ... | | |
| 10h | VERIFICATION COUNTER | MAXIMUM NUMBER | | |
| ... | ... | ... | | |
| 14h | ... | ... | RW | POSSIBLE TO UPDATE TO ANY VALUE |
| ... | ... | ... | | |
| 24h | NEW PRODUCT | 0 | WO | POSSIBLE TO UPDATE TO VALUE OTHER INITIAL VALUE ONLY ONCE |
| ... | ... | ... | | |

FIG. 10

| ADDRESS | INFORMATION CONTENT | INITIAL VALUE | AREA | DESCRIPTION OF AREA |
|---|---|---|---|---|
| 01h | MANUFACTURE DATE | MANUFACTURE DATE | RO | UPDATE PROHIBITION |
| 02h | SERIAL NUMBER | VALUE OF FOR EACH INDIVIDUAL | | |
| 03h | TONER REMAINING AMOUNT T | 100% | OW | ONLY VALUE INCREASE OR VALUE DECREASE AVAILABLE |
| ... | ... | ... | | |
| 14h | ... | ... | RW | POSSIBLE TO UPDATE TO ANY VALUE |
| ... | ... | ... | | |
| 24h | NEW PRODUCT | 0 | WO | POSSIBLE TO UPDATE TO VALUE OTHER INITIAL VALUE ONLY ONCE |
| ... | ... | ... | | |
| 34h | TONER REMAINING AMOUNT HISTORY | 100% | | |
| ... | ... | ... | | |

STORAGE DEVICE INCLUDING UPDATE RESTRICTION AREA, REPLACEABLE UNIT INCLUDING STORAGE DEVICE, AND PROCESSING APPARATUS FOR UPDATING DATA STORED IN STORAGE DEVICE

BACKGROUND OF THE INVENTION

Field of the Invention

The present invention relates to a technique for updating data stored in a storage device.

Description of the Related Art

An electro-photographic image forming apparatus exposes a charged photosensitive body to light to form an electrostatic latent image on the photosensitive body and develops the electrostatic latent image with a developing agent (toner) to form an image (toner image) on the photosensitive body. The image forming apparatus then forms an image on a sheet by directly transferring the image formed on the photosensitive body to a sheet such as a printing paper or transferring the image to a sheet via an intermediate transfer body such as an intermediate transfer belt. Also, the image forming apparatus may be configured to allow a component (replaceable unit), such as the photosensitive body, with a shorter service life than the main body of the image forming apparatus to be replaced. In other words, the image forming apparatus may be configured so that a predetermined replaceable unit is attachable to and detachable from the main body. Note that the replaceable unit includes consumables such as toner and a toner container containing toner. The replaceable unit also includes a plurality of components or members, such as toner containers and photosensitive bodies, housed in a single housing, for example. This housing, for example, is referred to as a cartridge, and the cartridge may be configured to be attachable to and detachable from the main body.

In recent years, the reuse of replaceable units, cartridges for example, is being performed. Japanese Patent Laid-Open No. 2005-331539 discloses a configuration for determining whether or not the components and members inside a replaceable unit can be used after a reusing process. Japanese Patent Laid-Open No. 2004-98564 discloses updating data stored in a storage device of a cartridge when reusing the cartridge.

Data indicating various types of information relating to the replaceable unit is stored in the storage device. The data may include a first data that is allowed to be updated only once by the image forming apparatus. Also, the data may include a second data that is allowed to have a data value increased only or a data value decreased only by the image forming apparatus. In this manner, the storage device of the replaceable unit may be set with data update restrictions. Take an example in which the storage device stores the first data in a first area and stores the second data in a second area. In this case, the storage device may be configured to prohibit updates from a second update onward after the data stored in the first area is updated a first time. In a similar manner, the storage device may be configured to perform an update to increase a data value or perform an update to decrease a data value of data stored in the second area, but not perform the reverse update. When the storage device is configured in this manner, data stored in the first area and the second area may be unable to be reset to an initial value or the like when reused, for example. Thus, there is a need for a storage device to be configured to allow the storage device to perform a data update outside of the range of the update restrictions as necessary in specific situations such as when the storage device is reused.

SUMMARY OF THE INVENTION

According to an aspect of the present invention, a storage device includes: a storage unit; and a control unit configured to determine, when a first command to update first data stored at a first address in a first area of the storage unit to second data is received from an external apparatus, whether or not an update from the first data to the second data is within an update restricted range set for the first area, and store the second data at the first address in a case where the update from the first data to the second data is within the update restricted range set for the first area, wherein, in a case where the update from the first data to the second data is not within the update restricted range set for the first area, the control unit is configured to verify a signature received from the external apparatus together with the first command, and, in a case where a verification result of the signature is verification success, the control unit is configured to store the second data at the first address and, in a case where a verification result of the signature is verification failure, the control unit is configured not to store the second data at the first address.

Further features of the present invention will become apparent from the following description of exemplary embodiments with reference to the attached drawings.

BRIEF DESCRIPTION OF THE DRAWINGS

FIG. 4 is an explanatory diagram of information stored in the storage device according to an embodiment.

FIG. 8 is an explanatory diagram of information stored in the storage device according to an embodiment.

FIG. 10 is an explanatory diagram of information stored in the storage device according to an embodiment.

DESCRIPTION OF THE EMBODIMENTS

Figure 1:
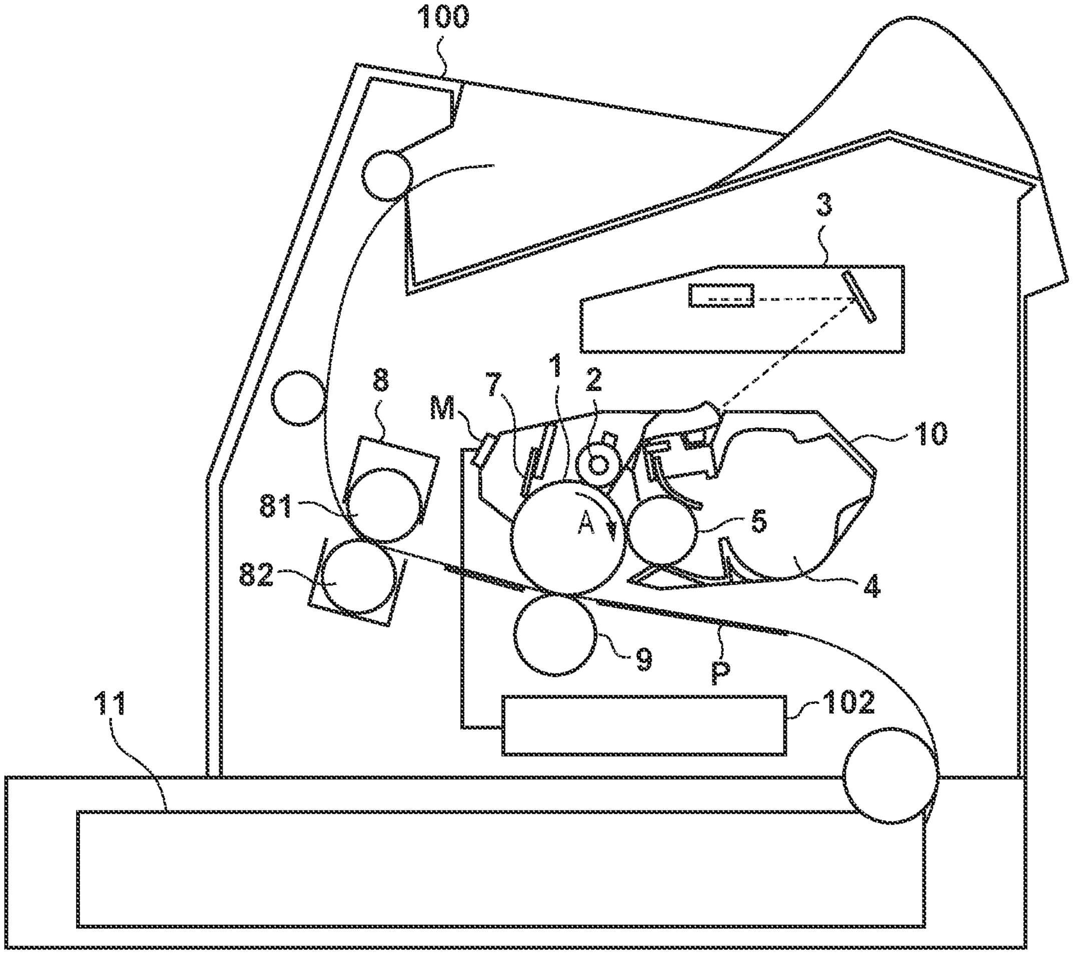
FIG. 1 is a cross-sectional view of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a configuration diagram of an image forming apparatus 100 according to the present embodiment. A photosensitive body 1 is an image carrier that is rotationally driven in the direction of arrow A when image forming is performed. A charging roller 2, which is a charging apparatus, outputs a charging voltage to charge the surface of the photosensitive body 1. An exposure apparatus 3 exposes the charged photosensitive body 1 with light on the basis of the image data of the image to be formed to form an electrostatic latent image on the photosensitive body 1. A developing roller 5, which is a developing apparatus, outputs a development voltage to develop the electrostatic latent image of the photosensitive body 1 with toner. In this manner, an image (toner image) is formed on the photosensitive body 1. Note that the toner is housed in a toner container 4.

A cassette 11 houses a sheet P. When image forming is performed, the sheet P housed in the cassette 11 is conveyed along a conveyance path to a position opposing the photosensitive body 1. A transfer roller 9 outputs a transfer voltage to transfer the image of the photosensitive body 1 onto the sheet P. A cleaning unit 7 removes and collects the toner remaining on the photosensitive body 1 not transferred to the sheet P. A fixing device 8 includes a heating roller 81 and a pressure roller 82 and applies heat and pressure to the sheet P to fix the image to the sheet P. After the image is fixed, the sheet P is discharged to the outside of the image forming apparatus 100. An engine control unit 102 performs the control of the members illustrated in FIG. 1 to form the image on the sheet P.

A process cartridge 10 (hereinafter, referred to simply as cartridge 10) includes the photosensitive body 1, the charging roller 2, the toner container 4, the developing roller 5, and the cleaning unit 7. Note that the toner container 4 houses toner. The cartridge 10 is a replaceable unit of the image forming apparatus 100 that is configured to be attachable to and detachable from the main body of the image forming apparatus 100. The cartridge 10 further includes a storage device M. The storage device M stores information of the cartridge 10 itself and information relating to the members, that is, the photosensitive body 1, the toner, and the like, housed in the cartridge 10. The information stored in the storage device M will be described below.

Figure 2:
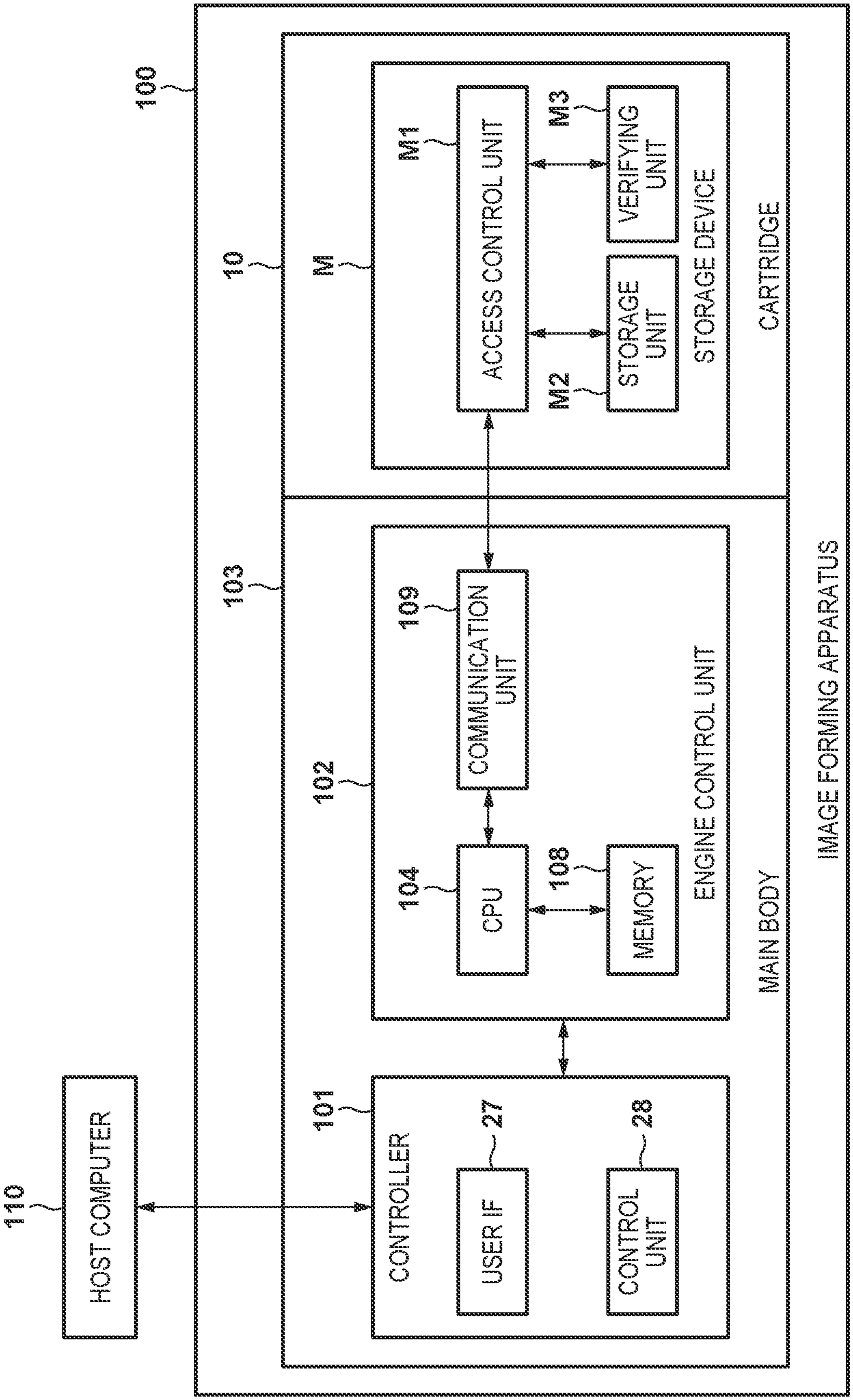
FIG. 2 is a functional block diagram of the image forming apparatus according to an embodiment.

FIG. 2 is an explanatory diagram of the control configuration of the image forming apparatus 100. Note that in FIG. 2, only the parts necessary for describing the present disclosure are illustrated, and parts that are not necessary for describing the present disclosure are omitted. A main body 103 of the image forming apparatus 100 includes a controller 101 and the engine control unit 102. The controller 101 includes a control unit 28 including one or more processors, a memory, and the like and a user interface (IF) 27 for the user to operate the image forming apparatus 100. The control unit 28 controls the entire image forming apparatus 100. The control unit 28 is configured to be able to communicate with a host computer 110 outside of the image forming apparatus 100 via a network, for example. When the control unit 28 receives an image formation instruction from the host computer 110 together with the image data, the control unit 28 instructs the engine control unit 102 to perform image formation based on the image data. The user IF 27 functions as a reception unit, that is, an input interface, for receiving commands and setting values input into the image forming apparatus 100 by the user. Also, the user IF 27 functions as a notification unit, that is, an output interface, for presenting and notifying the necessary information to the user.

Figure 3:
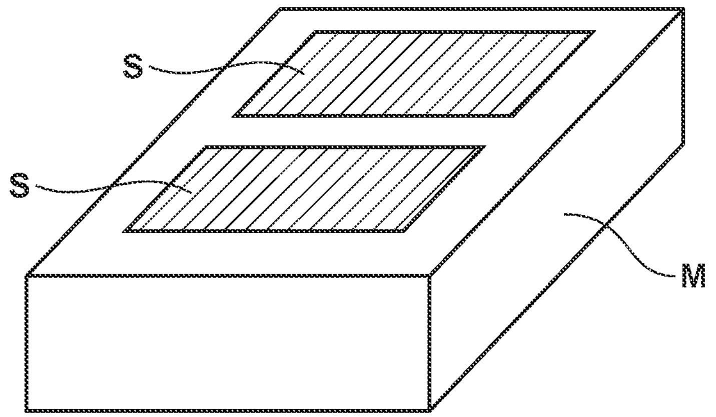
FIG. 3 is a configuration diagram of a storage device according to an embodiment.

A CPU 104 of the engine control unit 102, under the control of the controller 101, controls the members illustrated in FIG. 1 to form an image on the sheet P. A memory 108, for example, includes a volatile memory and a non-volatile memory and stores programs executed by the CPU 104 and various types of data used by the CPU 104 in performing control. A communication unit 109 is configured to communicate with an access control unit M1 of the storage device M provided in the cartridge 10 when the cartridge 10 is installed in the main body 103. For example, the communication unit 109 includes one or more external contact points. Also, the storage device M includes external contact points corresponding to the external contact points of the communication unit 109. FIG. 3 illustrates an example in which the storage device M includes two external contact points S. When the cartridge 10 is installed in the main body 103, one or more of the external contact points of the communication unit 109 is electrically connected to the corresponding external contact point S of the storage device M. The access control unit M1 and the communication unit 109 transmit and receive commands and data via the electrical connection.

A storage unit M2 of the storage device M is an electrically rewritable non-volatile memory such as an electrically erasable programmable read-only memory (EEPROM), for example. The access control unit M1, for example, may include a non-volatile memory storing a program and a processor for executing the program. The non-volatile memory of the access control unit M1 may also store control data used by the access control unit M1 in the processing executed by the access control unit M1.

The access control unit M1 writes data (information) to the storage unit M2 on the basis of a command from the communication unit 109 and reads out data from the storage unit M2. For example, in the case of reading out data stored at a certain address of the storage unit M2, the communication unit 109 transmits a read command to the access control unit M1. The read command includes the read out address (target address) of the data. When a read command is received, the access control unit M1 reads out the data stored at the target address of the storage unit M2 and notifies the communication unit 109. Also, in the case of writing data to a certain address of the storage unit M2 or updating data stored at a certain address of the storage unit M2, the communication unit 109 transmits a write command to the access control unit M1. The write command includes an address (target address) for writing or updating data and write data, that is, updated data. When a write command is received, the access control unit M1 stores the updated data at the target address of the storage unit M2. In this manner, the communication unit 109 functions as an access unit that, under the control of the CPU 104, accesses the storage device M to read out or update the information stored in the storage device M.

A verifying unit M3 of the storage device M verifies the digital signature (hereinafter, simply referred to as the signature). The verifying unit M3 stores a signature verification key. When the verifying unit M3 receives a message and a signature generated on the basis of the message from the access control unit M1, the verifying unit M3 uses the signature verification key to verify whether or not the signature is generated from the message. When the verifying unit M3 determines that the signature is generated from the message, the verifying unit M3 notifies the access control unit M1 of the verification success. On the other hand, when the verifying unit M3 determines that the signature is not generated from the message, the verifying unit M3 notifies the access control unit M1 of the verification failure. The signature, for example, can be generated using an elliptic curve digital signature algorithm (ECDSA).

Note that the signature is generated using a signature generation key corresponding to the signature verification key stored in the verifying unit M3. In the present embodiment, the signature generation key is not stored in the image forming apparatus 100. In other words, the image forming apparatus 100 is configured to be unable to generate a signature.

FIG. 4 is an explanatory diagram of a storage area of the storage unit M2 according to the present embodiment. The storage unit M2 stores data indicating various types of information relating to the cartridge 10. In the present embodiment, according to the attributes of the information to be stored in the cartridge 10, the storage area of the storage unit M2 is divided into four areas: a read only (RO) area, a one way (OW) area, a read write (RW) area, and a write once (WO) area. The RO area is an area where the update of data (information) is prohibited. The OW area is an area where update is possible only to increase a data value or only to decrease a data value. The WO area is an area where the data can be updated once only. The RW area is an area without an update restriction like the other areas and is an area where a data value can be updated to any data value within the bit number range corresponding to the address. In this manner, the storage device M is configured to allow the update of the data stored in the OW area and the WO area within the predetermined restrictions. Also, the storage device M is configured to not allow the data stored in the RO area to be updated. However, there are no such restrictions on updating the data of the RW area. Note that in the present embodiment, the area where the data value can only increase and the area where the data value can only decrease are both the OW area, but they may be different areas. In other words, for example, the area where the data value can only increase may be a first OW area, and the area where the data value can only decrease may be a second OW area.

Note that the data update restriction of each area is implemented by the access control unit M1. In other words, the processor of the access control unit M1 executes a program in the non-volatile memory to make data update for the RO area prohibited. Also, the access control unit M1 is configured to allow data to be updated once for the WO area and, once the data has been updated once, to prohibit data update thereafter. Furthermore, the access control unit M1 is configured to prohibit data update in a case where there is an instruction from the communication unit 109 to update the data of the OW area and a post-update data value would contravene the data update restriction of the OW area.

In the present embodiment, as illustrated in FIG. 4, the manufacture timing, which is the manufacture date of the cartridge 10, the serial number, and other specific information distinctive to the individual cartridge 10 that does not need to be changed is stored in the RO area. Note that the specific information here may be the specific information of the storage device M.

Also, usage information relating to the usage state of the members of the cartridge 10 and whether a value increases or decreases according to usage of the cartridge 10 is stored in the OW area. In FIG. 4, only toner remaining amount T is listed. The toner remaining amount T is information where the value only decreases as the cartridge 10 is used. In FIG. 4, the toner remaining amount T is represented by a percentage (%) of the maximum value for the remaining amount. Note that the usage information may include, in addition to the toner remaining amount T listed in FIG. 4, the usage amount of the photosensitive body 1 and the developing roller 5 (for example, an evaluation of the accumulated number of rotations or the accumulated number of sheet P with an image formed) and the like. These usage amounts are pieces of information where the value only increases as the cartridge 10 is used.

New product information is stored in the WO area. The initial value of the new product information is 0, and the information can only be rewritten to a value other than 0 once. In the present embodiment, the new product information being 0 means that the cartridge 10 is a new product, and the new product information being a value other than 0 means that the cartridge 10 has at least one time been installed into the main body 103 of an image forming apparatus. Accordingly, the CPU 104 of the image forming apparatus 100 is configured to update the data value of the new product information to 1 in a case where the data value of the new product information of the storage device M of the installed cartridge 10 is 0. Note that information that can be updated to any value is stored in the RW area, but this description is omitted as it is not necessary for describing the present embodiment. When the cartridge 10 is manufactured, the respective initial values listed in FIG. 4 are stored in each area of the storage unit M2 before shipping.

For example, when the cartridge 10 is to be reused, a reuse service provider performs on the cartridge 10 the processes needed for reuse including refilling the toner. The reuse service provider may be the manufacturer of the cartridge 10 or may not be the manufacturer. To use the cartridge 10 after the reuse process, in the image forming apparatus 100, the toner remaining amount T listed in FIG. 4 must be updated according to the toner amount refilled when the reuse process is performed. As described above, regarding the toner remaining amount T, the access control unit M1 is programmed to allow the value to only decrease. However, since the toner remaining amount increases via refilling, the update of the toner remaining amount T performed when the reuse process is performed is outside of the range of the update restriction of the OW area. Thus, to reuse the cartridge 10, the update restriction must be removed, and the data value corresponding to the post-refill toner remaining amount T must be written to an address 03_h_. The configuration for removing the update restriction of the storage unit M2 for reuse will be described below.

Figure 5A:
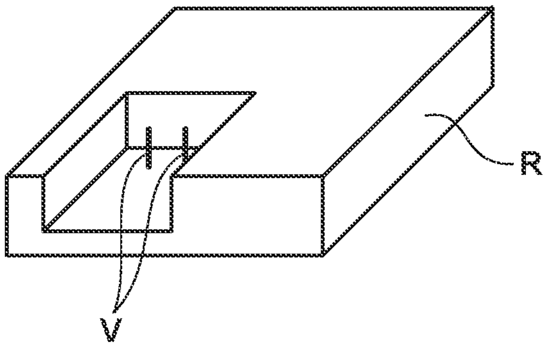
FIGS. 5A and 5B are explanatory diagrams of a processing apparatus according to an embodiment.
Figure 5B:
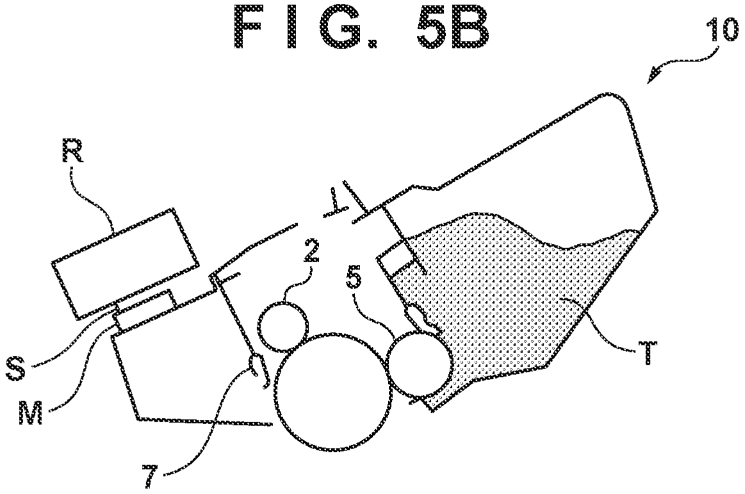

FIG. 5A is a schematic perspective view of a processing apparatus R configured to update the data stored in the storage device M when a reuse process is performed on the cartridge 10. FIG. 5B is an explanatory diagram of how the processing apparatus R is used. The processing apparatus R is used by a reuse service provider. As illustrated in FIG. 5A, the processing apparatus R includes contact points V corresponding to the contact points S of the storage device M. As illustrated in FIG. 5B, by electrically connecting the contact points V of the processing apparatus R to the corresponding contact points S of the storage device M, the processing apparatus R accesses the storage device M and updates the stored data.

Figure 6:
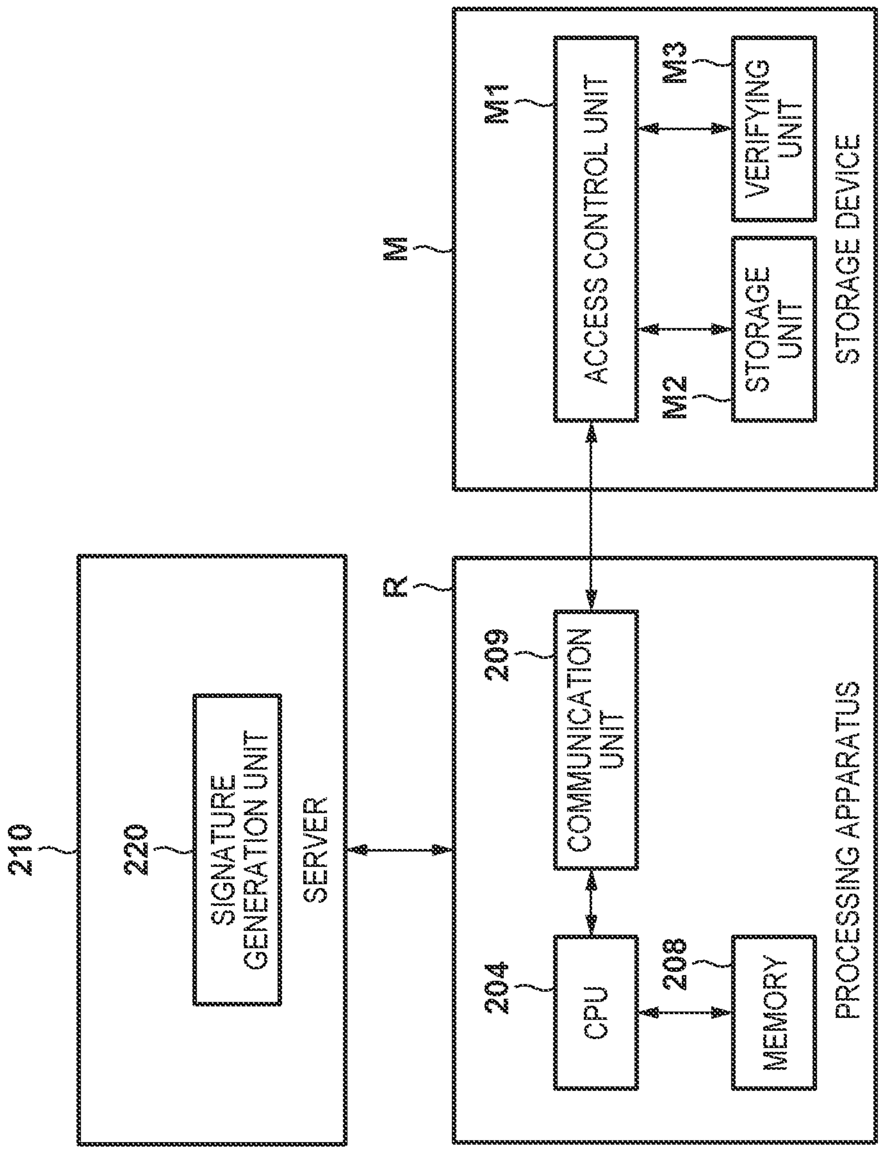
FIG. 6 is a configuration diagram of a system including the processing apparatus according to an embodiment.

FIG. 6 illustrates a system configuration for removing the update restriction of the storage unit M2 and updating the data stored in the storage unit M2. A memory 208 of the processing apparatus R, for example, includes volatile memory and non-volatile memory and stores programs executed by a CPU 204 and various types of data used by the CPU 204 in performing control. The CPU 204 executes both control of a communication unit 209 and communication processing with a server 210 via a network. The functions of the communication unit 209 are similar to the functions of the communication unit 109 (FIG. 2) of the image forming apparatus 100.

The server 210 stores the signature generation key corresponding to the signature verification key stored in the storage device M of the cartridge 10. In the present embodiment, the signature verification key of the storage device Mis different for each individual cartridge 10. Thus, the server 210 stores the signature generation key associated with the serial number of the cartridge 10. In the present embodiment, a message, from which a signature is generated, is a combination of the updated data and the manufacture date and serial number stored by the storage unit M2. The updated data is data indicating the value to be stored in the storage unit M2 after reuse processing has been performed. The updated data, for example, is input into the processing apparatus R via a non-illustrated user interface of the processing apparatus R by the reuse service provider. Note that, for example, in a case where the updated data is a predetermined value, such as when the post-reuse-process toner remaining amount T is always set to 100%, which is the same as the initial value, input of the value of the updated data is not necessary.

To cause the server 210 to generate the signature of the message, the CPU 204 first transmits a reuse preparation command to the access control unit M1. When the reuse preparation command is received, the access control unit M1 reads out the manufacture data and the serial number stored in the storage unit M2 and notifies the CPU 204. Note that the reuse preparation command may be a read command for reading out the data stored in the storage unit M2. The CPU 204 transmits a signature generation request signal including the notified manufacture date and serial number and the updated data to the server 210. When a signature generation unit 220 of the server 210 receives the signature generation request signal from the processing apparatus R, the signature generation unit 220 generates a signature based on the manufacture date, serial number, and updated data included in the signature generation request signal and transmits this to the processing apparatus R. In the present embodiment, the signature generation unit 220 determines the signature generation key to use in generating a signature from a plurality of stored signature generation keys based on the serial number. Note that the server 210 may be configured to generate a signature when a signature generation request signal is received from a predetermined processing apparatus R and not generate a signature when a signature generation request signal is received from other processing apparatuses R.

When the CPU 204 receives the signature from the server 210, the CPU 204 transmits a write command and the signature to the access control unit M1. The write command includes the target address and the updated data. The target address is the address to be updated of the storage unit M2. When the access control unit M1 receives a write command that contravenes the update restriction, the access control unit M1 notifies the verifying unit M3 of the write command, the received signature, and the message on which the signature is based and causes the verifying unit M3 to verify the signature. Note that the access control unit M1 generates a message on the basis of the manufacture date and serial number stored in the storage unit M2 and the updated data included in the write command. The access control unit M1 stores the updated data at the target address in accordance with the write command when a verification successful notification is received from the verifying unit M3. On the other hand, when a verification failure notification is received from the verifying unit M3, the access control unit M1 notifies the CPU 204 without storing the updated data at the target address.

Figure 7:
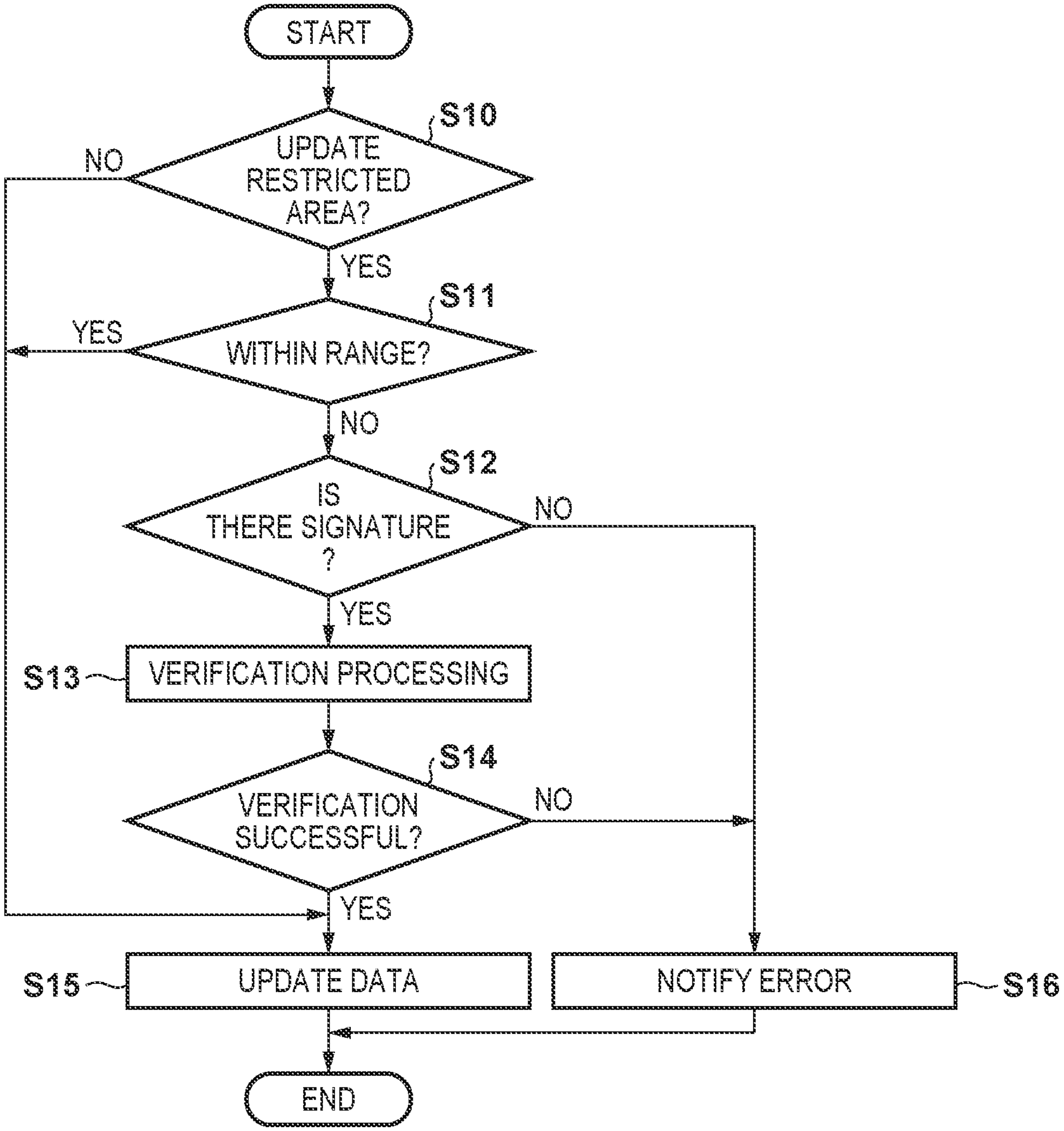
FIG. 7 is a flowchart of the processing executed by an access control unit according to an embodiment.

FIG. 7 is a flowchart of the processing executed by the access control unit M1 when the write command is received. In step S10, the access control unit M1 determines whether or not the target address of the write command is an address in an update restricted area. In the present embodiment, the update restricted areas are the RO area, the OW area, and the WO area. In a case where the target address is not an address in the update restricted area, in step S15, the access control unit M1 updates the data according to the write command and ends the processing of FIG. 7. On the other hand, in a case where the target address of the write command is an address in the update restricted area, in step S11, the access control unit M1 determines whether or not the updated data of the write command is within an update restricted range. For example, in a case where the target address is an address in the RO area, all cases are determined to be outside the update restricted range. Also, in the case of the toner remaining amount T in FIG. 4, a value for the updated data that is less than the current value is determined to be within the update restricted range. In a case where the updated data is within the update restricted range, in step S15, the access control unit M1 updates the data according to the write command.

On the other hand, in a case where the updated data is outside the update restricted range, in step S12, the access control unit M1 determines whether the signature has been received together with the write command. In a case where there is no signature, in step S16, the access control unit M1 notifies the CPU 204 of an error and ends the processing of FIG. 7. Note that in a case where the cartridge 10 is installed in the image forming apparatus 100, the CPU 104 is notified of the error. In a case where there is a signature, in step S13, the access control unit M1 notifies the verifying unit M3 of the signature and the message and causes the verifying unit M3 to verify the signature. In step S14, the access control unit M1 obtains the verification result for the signature from the verifying unit M3. If verification is successful, in step S15, the access control unit M1 stores the updated data at the target address according to the write command to update the data. On the other hand, if verification is unsuccessful, in step S16, the access control unit M1 notifies the CPU 204 of an error without storing the updated data at the target address.

In a case where a write command of outside the update restricted range for an update restricted area has been received and a valid signature is received together with the write command, the access control unit M1 removes the update restriction and updates the data according to the write command. With this configuration, after the reuse process, data outside the update restricted range can be updated even in an area of the storage unit M2 set with an update restriction. This allows post-reuse-process replaceable units to be used in the image forming apparatus 100. Also, since the signature generation key for generating a signature is not stored in the image forming apparatus 100, data outside of the update restricted range being updated in the image forming apparatus 100 can be prevented. In other words, only the reuse service provider with access to the signature generation key can update data above the update restriction.

This can help prevent the usage information and the like stored in the storage unit M2 deviating from the actual state of the cartridge 10.

Note that in the present embodiment, for the RO area, the OW area, and the WO area, when a write command is received together with a valid signature, the access control unit M1 updates the data according to the write command even if the data is outside the update restricted range. However, the areas where data can be updated according to the write command even if the data is outside the update restricted range may be either one or two of the RO area, the OW area, and the WO area. For example, the RO area may be configured such that updates are always prohibited irrespective of whether or not there is a valid signature, and the OW area and the WO area may be configured such that the update restriction is removed when there is a valid signature.

Furthermore, one or more sub-areas of the RO area, the OW area, and the WO area may be configured to remove the update restriction when there is a valid signature, and the other sub-areas may be configured to always maintain the update restriction irrespective of whether or not there is a valid signature. For example, regarding the WO area in FIG. 4, a second update is always prohibited for a sub-area addressed by address 24*h* storing the new product information irrespective of whether or not there is a valid signature, and other sub-areas of the WO area may be configured such that the update restriction is removed when there is a valid signature.

Accordingly, update restricted areas of step S10 in FIG. 7 may be entire region of the RO area, the OW area, or the WO area. Or update restricted areas of step S10 in FIG. 7 may be some part (sub-areas) of these areas. In this case, for data stored in the some part of these areas, the access control unit M1 is configured to update the data outside the update restricted range on the condition that there is a valid signature. On the other hand, for data stored in the other part, the access control unit M1 is configured to not update the data outside the restricted range irrespective of whether or not there is a valid signature.

Also, in the present embodiment, the signature verification key stored in the storage device M is different for each individual cartridge 10. However, the signature verification key of the storage device M is not necessarily different for each individual cartridge 10. For example, the signature verification key of the storage device M may be different per type of cartridge 10. In this case, the server 210 stores the signature generation key associated with the type of cartridge 10. Also, in the RO area of the storage unit M2, information indicating the type of the cartridge 10 is stored, or the serial number is configured such that the type of the cartridge 10 can be determined from the serial number. Furthermore, for example, the signature verification key of the storage device M may be the same for all of the cartridges 10. In a case where the signature verification key of the storage device M is the same for all of the storage devices M, the server 210 stores the signature generation key corresponding to the signature verification key which is the same for all of the storage devices M.

Also, in the present embodiment, when the CPU 204 receives the signature from the server 210, the CPU 204 transmits the signature together with the write command to the access control unit M1, but the message on which the signature is based on is not transmitted to the access control unit M1. This is because the access control unit M1 can generate the message from the updated data included in the write command and the manufacture date and serial number stored at a predetermined address of the storage unit M2. However, the CPU 204 may be configured to transmit the message on which the signature is based to the access control unit M1 together with the write command and the signature. In this case, for example, the access control unit M1 may be configured to compare the serial number included in the received message and the serial number stored in the storage unit M2 and, when the two do not match, notify (step S16 in FIG. 7) the CPU 204 of an error without updating the data. In this case, signature verification is not performed.

Furthermore, in the present embodiment, the write command includes the updated data. However, in a case where the value of the updated data is always the same such as when the value of the updated data after the reuse process by the reuse service provider is the initial value, the value of the updated data can be pre-stored in the non-volatile memory of the access control unit M1 or the RO area, for example. In this case, the write command does not need to include the updated data. Also, in the present embodiment, the manufacture date and the serial number are used to generate the message. However, a configuration may be used in which other predetermined data stored at a predetermined address of the storage unit M2 is used to generate the message. This predetermined data at least partially includes specific information specific to at least the cartridge 10 or the storage device M.

Also, in the present embodiment, the access control unit M1 and the verifying unit M3 of the storage device M are different functional blocks, but in another configuration, the access control unit M1 may be provided with the function of the verifying unit M3. In other words, a configuration may be used in which the processor of the access control unit M1 verifies the signature. Also, in the present embodiment, the processing apparatus R obtains the signature from the server 210, but a configuration may be used in which the processing apparatus R generates the signature. In other words, a configuration in which the processing apparatus R includes the function of the server 210 in FIG. 6 may be used.

Second Embodiment

Next, a second embodiment will be described, focusing on the points that differ from the first embodiment. In the first embodiment, the signature is generated on the basis of the manufacture date, the serial number, and the updated data. Here, the manufacture date and the serial number are always the same value. Also, the value of the updated data may be usually the initial value. For example, in the case of the toner remaining amount T illustrated in FIG. 4, typically, the toner amount refilled via the reuse process may be the maximum amount, and a post-refill toner amount of 90% or 80% may not be typical. In a case where the value of the updated data is always the same, the data value of the signature is also the same. Accordingly, if the data value of the signature is leaked, an entity other than the reuse service provider can perform an update above the update restriction. Thus, the present embodiment describes a configuration for preventing the data values of the signatures being the same.

Also, the storage unit M2 in general has an upper limit on the number of updates that can be performed. Also, the cartridge 10 may include a component/member that cannot be replaced even with the reuse process. Accordingly, there is a restriction on the number of times the cartridge 10 can be reused. The present embodiment describes a configuration in which the maximum number of times the cartridge 10 can be reused is set to prevent the reuse process being performed greater than the maximum number of times.

To prevent the data values of the signatures being the same, in the present embodiment, when the access control unit M1 receives a reuse preparation command, the access control unit M1 generates a random number and notifies the CPU 204 of the generated random number together with the manufacture date and the serial number. The CPU 204 can include in the signature generation request signal transmitted to the server 210 the manufacture date, the serial number, and the random number received as a response to the reuse preparation command. The server 210 generates a signature on the basis of the message, which is combination of the manufacture date, the serial number, and the random number, and notifies the CPU 204 of the signature. The CPU 204 notifies the access control unit M1 of the write command and the signature. When the access control unit M1 receives a write command that contravenes the update restriction, the access control unit M1 notifies the verifying unit M3 of the write command, the received signature, and the message on which the signature is based and causes the verifying unit M3 to verify the signature. Note that the access control unit M1 generates a message on the basis of the manufacture date and serial number stored in the storage unit M2 and the random number generated when the reuse preparation command is received and notified to the CPU 204. In this manner, using a random number to generate the signature prevents the data values of the signatures being the same.

Also, to manage the maximum number of reuses, in the present embodiment, as illustrated in FIG. 8, a verification counter is stored in the OW area. The initial value of the verification counter is the maximum number of reuses. The verification counter is information indicating the number of reuses and is also information indicating the number of times an update outside the update restricted range has been performed.

Figure 9:
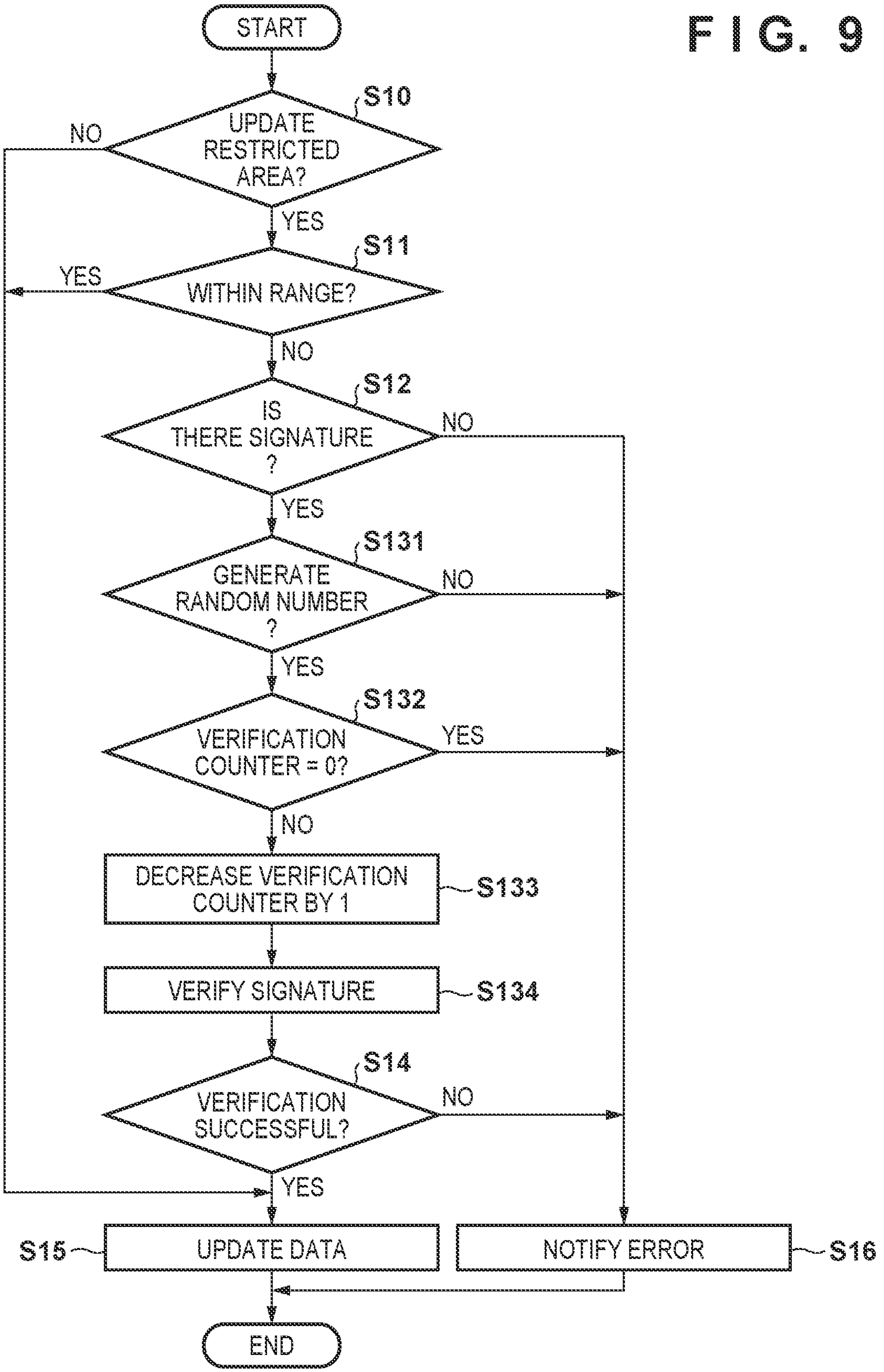
FIG. 9 is a flowchart of the processing executed by the access control unit according to an embodiment.

FIG. 9 is a flowchart of the processing executed by the access control unit M1 when the write command is received from the communication unit 209. Note that processing steps that are similar to that in the flowchart in FIG. 7 according to the first embodiment are given the same step number and descriptions thereof are omitted. In step S12, when there is a signature, in step S131, the access control unit M1 determines whether or not a random number has been generated in response to the reuse preparation command and notified to the CPU 204. In a case where a random number has not been generated, in step S16, the access control unit M1 notifies the CPU 204 of an error. In a case where a random number has been generated, in step S132, the access control unit M1 determines whether or not the value of the verification counter is 0. In a case where the value of the verification counter is 0, since the maximum number of reuses has been reached, in step S16, the access control unit M1 notifies to the CPU 204 of an error. In a case where the value of the verification counter is not 0, in step S133, the access control unit M1 updates the value of the verification counter by decreasing the value by 1. Then, in step S134, the access control unit M1 causes the verifying unit M3 to verify the signature. Note that in a case where a plurality of pieces of usage information are being managed and an update outside of the update restricted range is performed for each piece of usage information, the value of the verification counter can only be decreased once. In other words, by performing an initialization processing one time, the value of the verification counter is decrease by 1 only.

With the configuration described above, performing the reuse process more than the maximum number of times can be prevented. Also, by using a random number, the data values of the signatures being the same can be prevented.

Note that in another possible configuration, instead of a random number or in addition to a random number, the value of the verification counter in FIG. 8 is transmitted as a response to the reuse preparation command. In this case, the value of the verification counter is used to generate the message. Since the value of the verification counter is updated every time the data is updated, the data values of the signatures being the same can be prevented.

Note that in the present embodiment, the verification counter is stored in the OW area of the storage unit M2. In this case, the access control unit M1 is configured to prohibit an update outside of the update restricted range for the verification counter irrespective of whether or not there is a signature. Also, a configuration may be used in which the verification counter is stored in the non-volatile memory of the access control unit M1 instead of being stored in the storage unit M2.

Also, in the present embodiment, the CPU 204 may be configured to transmit the message to the access control unit M1 together with the write command and the signature. In this case, the access control unit M1 may compare the random number instead of or in addition to the serial numbers as described in the first embodiment. In other words, the access control unit M1 may be configured to compare the random number included in the received message and the generated random number and, when the two do not match, notify (step S16 in FIG. 9) the CPU 204 of an error without updating the data. In this case, signature verification is not performed. Note that in a case where the value of the verification counter is used to generate the message instead of or in addition to a random number, the values of the verification counter may be compared and similar processing may be executed.

Third Embodiment

Next, a third embodiment will be described, focusing on the points that differ from the embodiments described above. In the embodiments described above, by updating the usage information (the toner remaining amount T and the like) when the reuse process is performed, the pre-reuse-process usage information is lost. In the present embodiment, the pre-reuse-process usage information is backed up in the storage unit M2 as history information, allowing the usage information to be used in determining the cause of a problem should one arise.

As illustrated in FIG. 10, in the present embodiment, the history information of the toner remaining amount T is stored at an address 34*h* (backup address) of the WO area. For example, in a case where an update is performed outside of the update restricted range for the toner remaining amount T of the address 03*h* via a write command received together with a valid signature, the access control unit M1 first copies the current value of the address 03*h* to the backup address 34*h*. Thereafter, the access control unit M1 stores the updated data at the address 03*h* according to the write command.

Note that in FIG. 10, only "toner remaining amount T" is listed as the usage information, but the usage information may include other information. In a case where a plurality of pieces of usage information are managed in the OW area, all of the pieces of the usage information or one or more pieces are backed up. Note that the backup address of the usage information may be determined on the basis of the address of the OW area storing the usage information. Also, a configuration can be used in which, even from a second reuse process onward, the history information is stored at the same backup address in the WO area. In this case, the access control unit M1 removes the update restriction of the WO area storing the history information of the usage information via a write command of the usage information of the OW area received together with a valid signature. Also, a configuration, in which an area for writing the history information for each reuse process is provided in the WO area, can be used. In this case, the size of the area for writing the history information may be decided on the basis of the maximum number of reuses.

Figure 11:
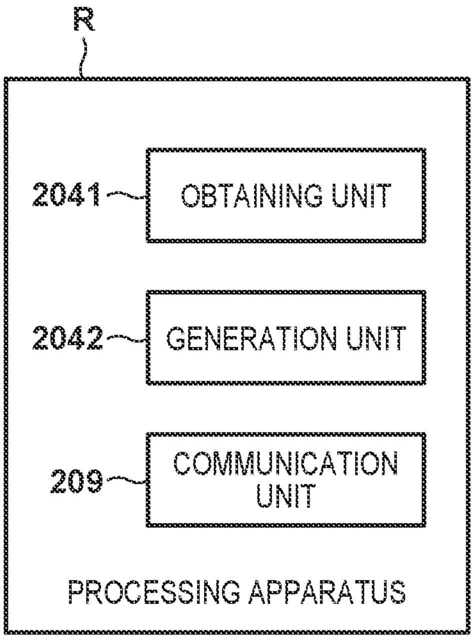
FIG. 11 is a functional block diagram of the processing apparatus according to an embodiment.

FIG. 11 is a functional block diagram of the processing apparatus R according to the embodiments described above. The CPU 204 of the processing apparatus R functions as an obtaining unit 2041 and a generation unit 2042 by executing a program stored in the memory 208.

In a case where the data in a predetermined update restricted area of the storage device M is updated, the generation unit 2042 generates a message for generating the signature. Specifically, in the first embodiment, the message is generated on the basis of the manufacture date, the serial number, and the updated data, and in the second embodiment, the message is generated on the basis of the manufacture date, the serial number, and a random number. Note that the manufacture date, the serial number, and the random number are obtained from the storage device M via the communication unit 209.

The obtaining unit 2041 obtains the signature generated from the message generated by the generation unit 2042. Specifically, the obtaining unit 2041 obtains the signature by transmitting the message generated by the generation unit 2042 to the server 210 and by receiving the signature from the server 210. Note that in a case where the signature generation key is stored by the processing apparatus R, the obtaining unit 2041 may be configured to generate the signature.

The communication unit 209 transmits the signature obtained by the obtaining unit 2041 to the storage device M together with the write command. Note that the communication unit 209 can further transmit the message, from which the signature is generated, to the storage device M together with the write command and the signature.

Note that the processing apparatus R may be configured to always transmit the signature together with the write command irrespective of the area where data update is to be performed. Also, in the case of updating the data of an update restriction area, the processing apparatus R may be configured to transmit the signature together with the write command irrespective of whether or not data update restriction of the update restriction area is removed with a valid signature. Furthermore, the processing apparatus R may be configured to transmit the signature together with the write command only in the case of an area with a set update restriction and its data update restriction being removed with a valid signature when data update is performed.

Other Embodiments

In the embodiments described above, the storage device M is provided in the cartridge 10 of the electro-photographic image forming apparatus 100. However, the storage device M may be provided in any replaceable unit of the image forming apparatus 100. Also, in the embodiments described above, the electro-photographic image forming apparatus 100 is a monochrome image forming apparatus. However, a color image forming apparatus may be used, or another type of image forming apparatus such as an inkjet type may be used. Furthermore, the apparatus using the replaceable unit provided with the storage device M is not limited to being an image forming apparatus, and any apparatus can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185747, filed Nov. 21, 2022, which is hereby incorporated by reference herein in its entirety.

What is claimed is:

1. A storage device comprising:
- a storage unit; and
- a controller configured to:
  - receive, from an external apparatus, a signature and a first command to update first data stored at a target address to second data,
  - perform a first determination of whether or not the target address is within a first area of the storage unit, the first area being an update restricted area, and
  - effect control based on a result of the first determination to:
    - in a case where the target address is not within the first area, store the second data at the target address, and
    - in a case where the target address is within the first area,
      - perform a second determination of whether or not an update from the first data to the second data is within an update restricted range set for the first area, and
      - effect control based on a result of the second determination to:

in a case where the update from the first data to the second data is within the update restricted range set for the first area, store the second data at the target address, and in a case where the update from the first data to the second data is not within the update restricted range set for the first area, perform verification of the signature received from the external apparatus together with the first command, and effect control based on a result of the verification to:

in a case where the verification result of the signature is verification success, store the second data at the target address and, in a case where the verification result of the signature is verification failure, not store the second data at the target address.

2. The storage device according to claim 1, wherein the controller is further configured so that, in a case where the target address is within the first area and the update from the first data to the second data is not within the update restricted range set for the first area, and the signature has not been received from the external apparatus together with the first command, the controller does not store the second data at the target address.

3. The storage device according to claim 1, wherein in the case where the verification result is verification failure and the controller does not store the second data, the controller performs error notification.

4. The storage device according to claim 1, wherein the second data is included in the first command.

5. The storage device according to claim 1, further comprising:

a verifying unit including a signature verification key, and configured to determine, when the signature and a message is received from the controller, whether or not the signature is generated from the message using the signature verification key, and notify the controller of the verification success when determining that the signature is generated from the message, and notify the controller of the verification failure when determining that the signature is not generated from the message, wherein the controller is configured to verify the signature by receiving the message from the external apparatus together with the first command and by transmitting the message received from the external apparatus together with the first command and the signature to the verifying unit.

6. The storage device according to claim 5, wherein the controller is further configured so that, in a case where the message does not include predetermined data stored at a predetermined address of the storage unit, the controller does not verify the signature and does not to store the second data at the target address.

7. The storage device according to claim 5, wherein the controller is further configured so that, in a case where the message does not include a random number transmitted to the external apparatus by the controller before the first command is received from the external apparatus or a value indicating a number of updates of data stored at the target address, the controller does not verify the signature and does not store the second data at the target address.

8. The storage device according to claim 1, further comprising:

a verifying unit including a signature verification key, and configured to determine, when the signature and a message is received from the controller, whether or not the signature is generated from the message using the signature verification key, and notify the controller of the verification success when determining that the signature is generated from the message, and notify the controller of the verification failure when determining that the signature is not generated from the message, wherein the controller is configured to verify the signature by generating the message based on predetermined data stored at a predetermined address of the storage unit and by transmitting the message generated based on the predetermined data and the signature to the verifying unit.

9. The storage device according to claim 8, wherein the predetermined data includes specific information of the storage device or a unit using the storage device.

10. The storage device according to claim 8, wherein the controller is configured to generate the message based on the predetermined data and the second data.

11. The storage device according to claim 8, wherein the controller is configured to generate the message based on the predetermined data and a random number transmitted to the external apparatus before the first command is received from the external apparatus.

12. The storage device according to claim 11, wherein the controller is further configured so that, in a case where the update from the first data to the second data is not within the update restricted range set for the first area and the random number has not been transmitted to the external apparatus before the first command is received from the external apparatus, even if the signature is received together with the first command from the external apparatus, the controller does not verify the signature and does not store the second data at the target address.

13. The storage device according to claim 11, wherein the controller is configured to manage a maximum number of data updates outside of the update restricted range set for the first area, and in a case where the update from the first data to the second data is not within the update restricted range set for the first area and a number of updates of the target address has reached the maximum number, even if the signature is received together with the first command from the external apparatus, the controller does not verify the signature and does not store the second data at the target address.

14. The storage device according to claim 1, wherein the controller is further configured so that, in a case where the update from the first data to the second data is not within the update restricted range set for the first area and a verification result of the signature is the verification success, the controller stores the second data at the target address after storing the first data at a backup address determined from the target address.

15. The storage device according to claim 1, wherein the first area includes one or more areas from among an area provided with the update restriction of only allowing an update to increase a data value, an area with the update restriction of only allowing an update to decrease a data value, an area provided with the update restriction of only allowing a data value to be updated once, and an area provided with the update restriction of not allowing a data value to be updated.

16. The storage device according to claim 15, wherein the controller is further configured to determine, when a second command to update third data stored at a second address in a second area of the storage unit different from the first area to fourth data is received from the external apparatus, whether or not an update from the third data to the fourth data is within an update restricted range set for the second area, and store the fourth data at the second address in a case where the update from the third data to the fourth data is within the update restricted range set for the second area.

17. The storage device according to claim 16, wherein the second area includes one or more areas from among an area provided with the update restriction of only allowing an update to increase a data value, an area with the update restriction of only allowing an update to decrease a data value, an area provided with the update restriction of only allowing a data value to be updated once, and an area provided with the update restriction of not allowing a data value to be updated.

18. The storage device according to claim 15, wherein the controller is further configured to store, when a third command to update fifth data stored at a third address in a third area, to which an update restriction is not set, different from the first area of the storage unit to sixth data is received from the external apparatus, the sixth data at the third address.

19. A replaceable unit configured to be attachable to and detachable from a main body of an image forming apparatus, comprising:

a member used in image formation by the image forming apparatus; and a storage device, wherein the storage device includes a storage unit, and a controller configured to:

receive, from the main body, a signature and a first command to update first data stored at a target address to second data, perform a first determination of whether or not the target address is within a first area of the storage unit, the first area being an update restricted area, and effect control based on a result of the first determination to:

in a case where the target address is not within the first area, store the second data at the target address, and in a case wherein the target address is within the first area, perform a second determination of whether or not an update from the first data to the second data is within an update restricted range set for the first area, and effect control based on a result of the second determination to:

in a case where the update from the first data to the second data is within the update restricted range set for the first area, store the second data at the target address, and in a case where the update from the first data to the second data is not within the update restricted range set for the first area, perform verification of the signature received from the main body together with the first command, and effect control based on a result of the verification to:

in a case where the verification result of the signature is verification success, store the second data at the target address and, in a case where a verification result of the signature is verification failure, not store the second data at the target address.

20. The replaceable unit according to claim 19, wherein the main body of the image forming apparatus is configured to be unable to generate the signature.

* * * * *